INVENTOR.
Albert Gross
BY Kenneth W. Brown, Atty 2,973,282

PROCESS FOR THE SURFACE TREATMENT OF FINELY-DIVIDED OXIDES OR OXIDE MIXTURES

Albert Gross, Rheinfelden, Germany, assignor to Deutsche Gold- und Silber-Scheideanstalt vormals Roessler, Frankfurt am Main, Germany, a corporation of Germany Filed July 20, 1956, Ser. No. 599,252

Claims priority, application Germany July 23, 1955

3 Claims. (Cl. 106—308)

The invention concerns a process for the surface treatment of oxides of metals or metalloids or their mixtures and is, especially when directed to the reaction of the OH-groups present on the surface of such oxides with alcohols, a topochemical reaction which probably proceeds with esterification.

It has been known for a long time that finely divided oxides of metals or metalloids, especially silicic acid (silica), are not completely inert on the surface of their particles, but that OH-groups are present there which are capable of a number of reactions. It has already been suggested to react these OH-groups of silicon dioxide in a topochemical manner, and thus obtain especially valuable fillers for natural or synthetic rubbers or other plastic products. The treating of silicic acid with alcohols to provide their surfaces with an organophile character is also known, being described, for example, in U.S. Patent No. 2,657,149 of Iler. However, treatment by the known process always took place in the liquid phase so that it was necessary, after termination of the reaction, to separate the surface-treated silicic acid from the liquid, and to dry it, a process in which undesirable surface changes could not always be prevented with absolute certainty. The known process is, therefore, more suitable for oxides obtained by a wet method rather than for those that are not formed in a liquid medium and which, for treatment by the known process, would first have to be dispersed in liquids.

Accordingly, it is the object of this invention and for the purpose of eliminating these disadvantages to provide a process in which the reaction of the OH-groups with alcohol at the surface of oxides, for example, of silicon dioxide, is carried out practically exclusively in the absence of a liquid phase in such a manner that the extensively or completely anhydrous oxides are treated with alcohols in the vapor phase. In order to assure a good contact between the oxide surface and the alcohol vapor this treatment is preferably carried out in a vortex bed or flow bed.

The alcohol is combined with the finely divided oxides treated in the vapor phase, in a step-wise topochemical reaction in such a strong manner that it can no longer be removed by extraction with anhydrous, inert organic solvents such as e.g., diethyl ether.

Figure 2:
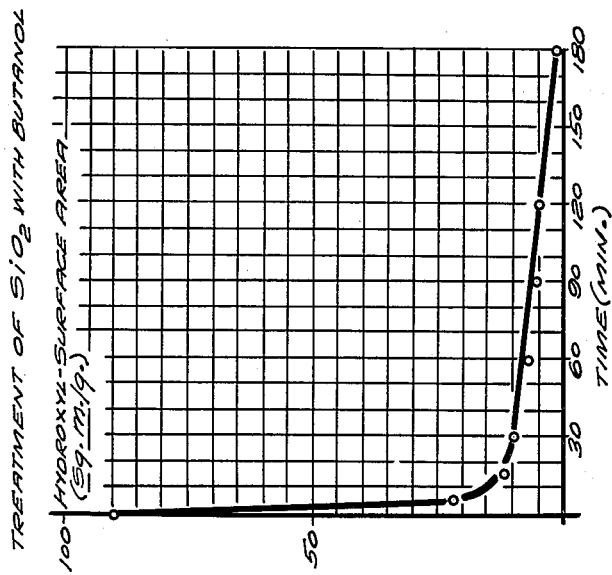
Figure 1:
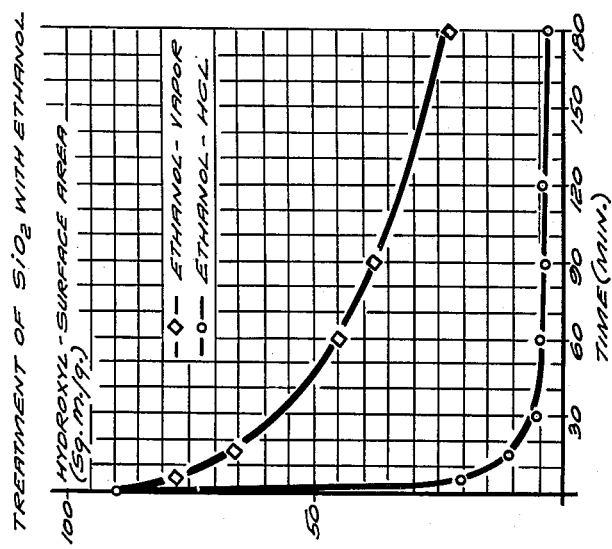
Figure 3:
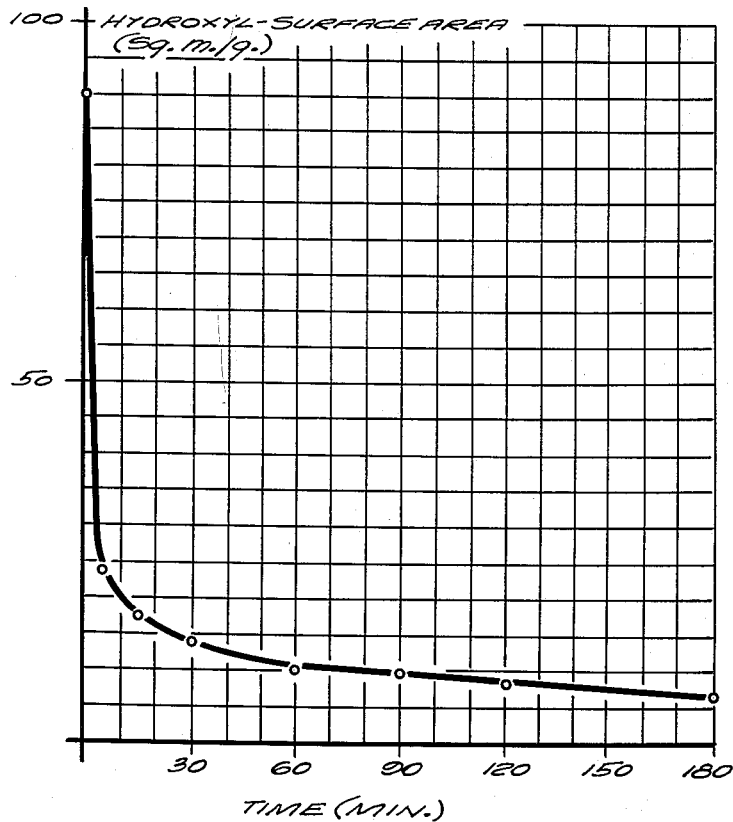

The effectiveness of the treatment can be readily observed by the decrease of the free OH-groups on the surface, for instance by determination of the methyl red absorption as shown in the accompanying drawings which are graphs depicting the decrease in hydroxyl-group-containing surface area of silica treated respectively with ethanol (Fig. 1), butanol (Fig. 2) and methyl-glycol (Fig. 3), all in the presence of an acid except as otherwise noted in Fig. 1.

Although the presence of strong acids and alkalies is considered undesirable in esterification processes carried out in the sump phase because of their disadvantageous effects on the stability of the products, it was nevertheless found that with the aid of the change in methyl red absorption the use of volatile acid substances which are known as esterification catalysts, greatly favors the time factor in the decrease of the free OH-groups. This is true particularly for the addition of hydrochloric acid to the alcohol vapor.

The process of the invention can be fundamentally applied to oxides of all kinds and manufacture such as are known in finely divided form for numerous purposes. It may be applied to silicon dioxide or metal oxides obtained by precipitation from the corresponding solutions, for instance by the reaction of water glass with acids or substances with acid action, or also to oxides which have been prepared by the treatment or degradation of the corresponding compounds, especially from natural substances.

The advantages of the process become especially evident, however, for those oxides which, by the nature of their method of manufacture, are obtained in the dry state and which, by the new method, are no longer in need of contact with a liquid phase in order to be able to effect the reaction of the OH-groups on the surface. This applies particularly to oxides obtained by the thermal decomposition of volatile metal or metalloid compounds in the gaseous phase in presence of gases or vapors with oxidizing or hydrolyzing action, possibly in a flame, by otherwise known methods, and which are obtained in extraordinarily fine particle sizes, namely in primary particle sizes between 5 and 100 millimicrons, preferably between 5 and 25 millimicrons. In spite of their formation by pyrogeneous methods such oxides also contain a considerable portion of OH-groups on the surfaces of their particles so that they can be subjected to the process of the invention with good results. If, in the preparation of these oxides, one starts with chlorine-containing volatile compounds, e.g., for the preparation of silicon dioxide, with silicon tetrachloride, then the hydrolyzing decomposition forms hydrogen halide in addition to silicon dioxide, the former remains adsorbed on the surface of the particles in small amounts and thus presents the catalytically active addition required for the subsequent treatment with the alcohol vapor. Thus, a preferred way of carrying out the invention would comprise the treatment of those oxides which still contain hydrogen halide, preferably in quantities between 0.01 and 1.5%, in the adsorbed state.

In order to obtain as extensive a surface change as possible it is naturally desirable to subject to treatment with alcohol vapors those oxides which exhibit as high as possible a proportion of free OH-groups. Such oxides are obtained in a particularly simple manner according to the method briefly described above relating to the pyrogeneous decomposition of volatile compounds, by effecting this decomposition with oxidative or hydrolytic cleavage at temperatures below 900° C.

The oxides may also be enriched in their OH-group content prior to the treatment with alcohols by, e.g., treating them with superheated steam.

In addition to the pure oxides, oxide mixtures or so-called mixed oxides which are formed when mixtures of volatile compounds are simultaneously decomposed in the vapor phase to form oxides, may be treated in accordance with the invetnion. In this manner it is possible to combine the unusual properties of such mixed oxides with the interesting changes of property obtained by the reaction of the surface-bound OH-groups, and thus to secure especially valuable products.

The selection of the alcohols with which the process of the invention is to be carried out depends essentially on the properties which are to be imparted to the oxide surface. In general, it is desirable to make use of alcohols containing not more than 20 carbon atoms in a straight or branched chain. Especially stable products are obtained by using alcohols which are capable of forming esters with small hydrolysis constants, thus, e.g., polyvalent, partially esterified or etherified alcohols, like, e.g., monoalkyl glycol, among which monomethyl glycol has proved highly satisfactory.

As already mentioned, the products obtained by the process of the invention exhibit novel surface properties which are indicative of an increased organophilia, which is generally readily discernible after the majority of the original hydroxyl groups has been reacted and even hydrophobia in some cases, depending on the nature of the reactant alcohol and the extent of reaction. Thereby, for example, the wettability and thus the workability of the oxides into rubber and other plastic substances is greatly improved, and the behavior of such oxides in lacquers and other organic media is likewise favorably affected. The products obtained can, moreover, be employed to advantage in the manufacture of temperature-stable gel greases of high resistance against water and steam.

*Example 1*

60 grams of anhydrous, finely divided silicic acid produced by pyrogeneous methods, the specific surface of which amounts to 180 square meters per gram, as determined by nitrogen adsorption according to the method of Brunauer, Emmett and Teller (J. Amer. Chem. Soc., v. 60, p. 309 (1938)), and the surface parts of which, with hydroxyl groups, was determined by methyl red adsorption according to the method of Shapiro and Kolthoff (J. Amer. Chem. Soc., v. 72, p. 776 (1950)) at 90 square meters per gram, are exposed at 98° C. in a vortex bed to a current of anhydrous ethyl alcohol vapor, and the decrease of the hydroxyl-group containing surface area is noted periodically. In a parallel run, the same amount of silicic acid is treated with an anhydrous mixture of ethyl alcohol vapor and gaseous hydrochloric acid, obtained by evaporation of a 17% solution of gaseous hydrogen chloride, in anhydrous ethyl alcohol using the same technique. The chronological decrease of the hydroxyl-group-containing surface area can be noted from Figure 1.

The samples of silicic acid thus obtained, after removal of adsorbed substances in a vacuum over NaOH, and with a progressive decrease of the hydroxyl-group-containing surface area, exhibited an ever-more promounced wettability by organic solvents. Once the hydroxyl-group-containing surface area has decreased below 10–15 square meters per gram, the silicic acid particles can no longer be wetted by water.

*Example 2*

60 grams of the silicic acid described in Example 1 is treated by the method described in the example, at 130° C., using a mixture of n-butanol-HCl vapor obtained by the evaporation of a 20% solution of HCl-gas in anhydrous butanol. The decrease of the hydroxyl-group-containing surface area can be noted from Figure 2.

*Example 3*

60 grams of the pyrogeneous silicic acid as described in Example 1 are reacted at 138° C. with a vapor mixture obtained by evaporation of a 10% solution of HCl in anhydrous methyl glycol, using the method described in Example 1. The silicic acid obtained after removal of the adsorbed vapors in a vacuum over solid NaOH is still wettable with water, although its surface is practically free from OH-groups, but is organophilic to a high degree. It is capable of producing a stable "water in alcohol" gel with a butanol-water mixture, without itself entering into the aqueous phase. The decrease of the hydroxyl-group-containing surface area can be noted from Fig. 3.

Having thus described my invention, I claim:

1. A process for improving the surface characteristics of finely divided pyrogenic silica which comprises contacting such silica in the form of a dry powder with a substantially anhydrous gas consisting of a minor proportion of a strong acid vapor and vapors of alcohols containing not over 20 carbon atoms in a straight or branched chain, the time of contact being sufficient to effect reaction of at least the majority of hydroxyl groups on the surface of said silica.

2. A process as set out in claim 1 in which said acid is hydrogen chloride.

3. A process for improving the surface characteristics of finely divided pyrogenic silica which comprises flowing a vaporous mixture of an anhydrous alcohol containing not over 20 carbon atoms in a straight or branched chain and hydrogen chloride in a minor proportion not exceeding 20% by weight of said vaporous mixture in contact with said silica for sufficient time to neutralize the majority of the hydroxyl groups on the surface of said silica.

References Cited in the file of this patent

UNITED STATES PATENTS

| | | |
|---|---|---|
| 2,583,603 | Sirianni et al. | Jan. 29, 1952 |
| 2,657,149 | Iler | Oct. 27, 1953 |
| 2,680,696 | Broge | June 8, 1954 |
| 2,728,732 | Arnett et al. | Dec. 27, 1955 |